US012784609B2

(12) United States Patent
Matayoshi et al.

(10) Patent No.: US 12,784,609 B2
(45) Date of Patent: Nov. 3, 2026

(54) NEURAL NETWORK-BASED ASSESSMENT ENGINE FOR THE DETERMINATION OF A KNOWLEDGE STATE

(71) Applicant: McGraw Hill LLC, New York, NY (US)

(72) Inventors: Jeffrey Seiichi Matayoshi, Irvine, CA (US); Eric Emile Cosyn, Irvine, CA (US)

(73) Assignee: McGraw Hill LLC

( * ) Notice: Subject to any disclaimer, the term of this patent is extended or adjusted under 35 U.S.C. 154(b) by 286 days.

(21) Appl. No.: 18/536,844

(22) Filed: Dec. 12, 2023

(65) Prior Publication Data

US 2024/0194088 A1 Jun. 13, 2024

Related U.S. Application Data

(60) Provisional application No. 63/432,116, filed on Dec. 13, 2022.

(51) Int. Cl.
*G09B 7/04* (2006.01)
*G09B 7/02* (2006.01)

(52) U.S. Cl.
CPC ................ *G09B 7/04* (2013.01); *G09B 7/02* (2013.01)

(58) Field of Classification Search
None
See application file for complete search history.

(56) References Cited

U.S. PATENT DOCUMENTS

2015/0170536 A1* 6/2015 Lan ........................ G06N 20/00 434/350
2016/0086498 A1* 3/2016 Popat ........................ G09B 5/00 434/322
2019/0333400 A1* 10/2019 Saini .................... G06Q 10/107
2020/0302296 A1* 9/2020 Miller ...................... G09B 5/00

* cited by examiner

*Primary Examiner* — Dmitry Suhol
*Assistant Examiner* — Ishayu Singh
(74) *Attorney, Agent, or Firm* — Lowenstein Sandler LLP

(57) ABSTRACT

Methods and systems relating to the use of a neural network model executed by a processing device to determining an initial knowledge state of a student relating to a subject. A vector representation of a set of items associated with the subject is generated. The neural network model is executed to generate an assessment including at least a portion of the set of items relating to the subject. A first item of the set of items is provided to the student and a first response to the first item is received from the student. Based on the first response to the first item, an updated vector representation is generated. Based on the updated vector representation and the initial knowledge state, a first set of probabilities associated with an updated knowledge state of the student corresponding to the set of items relating to the subject is generated.

20 Claims, 8 Drawing Sheets

NEURAL NETWORK-BASED ASSESSMENT ENGINE FOR THE DETERMINATION OF A KNOWLEDGE STATE

CROSS-REFERENCE TO RELATED APPLICATION

This application claims the benefit of U.S. Provisional Application No. 63/432,116, filed Dec. 13, 2022, the entirety of which is incorporated herein by reference.

TECHNICAL FIELD

The disclosure relates generally to a digital learning platform, and more particularly to an assessment engine that uses a neural network architecture to determine a knowledge state of a student from a set of possible knowledge states of a knowledge structure.

BACKGROUND

In an educational environment, it is desirable to track a student's progress relating to a corresponding academic field. Educational products are employed to administer course materials associated with an academic field to a number of students and model and assess a student's knowledge state. A knowledge state represents a set of problem types or items within an academic field of study that a student "knows" or has established a threshold level of proficiency. Certain systems use a knowledge space theory (KST) approach to mathematically model and assess a student's knowledge state from among a set of feasible or possible knowledge states (i.e., a collection of feasible knowledge states referred to as a "knowledge structure"). For example, the knowledge structure can be used to define a prerequisite relation between topics or items, where if every feasible knowledge state containing item b also contains item a, then item a is a prerequisite to item b.

Increasing amounts of educational content (e.g., number of problem types) are administered and managed by the respective course product to assess and determine a student's knowledge state associated with a subject or academic field. The increased amount of content results in the expansion of the number of feasible knowledge states of the knowledge structure associated with each subject.

Certain knowledge space theory-based approaches perform a probabilistic search of the knowledge structure to identify a student's knowledge state. However, these approaches fail to account for the large amount of data available in online learning systems in assessing a knowledge state of a student. Furthermore, these probabilistic approaches fail to output a probability after each question presented to a student that is consistent with and adapted to the set of feasible states, which leads to inconsistencies in actual assessments. In such cases, these systems generate an assessment of a student's performance that is compatible with multiple different feasible states, which results in measurable uncertainty and inaccuracy in the state returned by the assessment.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a system (herein referred to as a "knowledge state assessment system") to execute one or more methods or processes to perform functions and operations to determine a knowledge state of a student from a set of feasible knowledge states in accordance with an adaptive neural network-based assessment. According to embodiments, the knowledge state is a representation of a proficiency level of a student with respect to a subject area or body of knowledge.

According to embodiments, the knowledge state assessment system generates a knowledge structure including a set of feasible or possible knowledge states associated with a subject area or body of knowledge (e.g., an academic field, a topic, a subject, etc.). The knowledge state assessment system uses the established knowledge structure to discover or determine a current knowledge state associated with a student, where the student's current knowledge state is selected or determined from among the feasible knowledge states of the knowledge structure.

According to embodiments, the knowledge state assessment system 100 determines a current knowledge state of the student using a methodology including a neural network-based probabilistic determination (e.g., to account for the student's careless errors and guesses) and a neural network-based adaptive determination to adaptively select an optimized "next" or subsequent item (e.g., a question) to present to the student in view of the one or more prior or previous answers submitted by the student in response to the one or more previously presented items (e.g., the one or more previously asked questions). Advantageously, the neural network-based probabilistic determination enables the knowledge state assessment system 100 to more accurately identify a final knowledge state of a student from among the feasible knowledge states of the knowledge structure.

Figure 1:
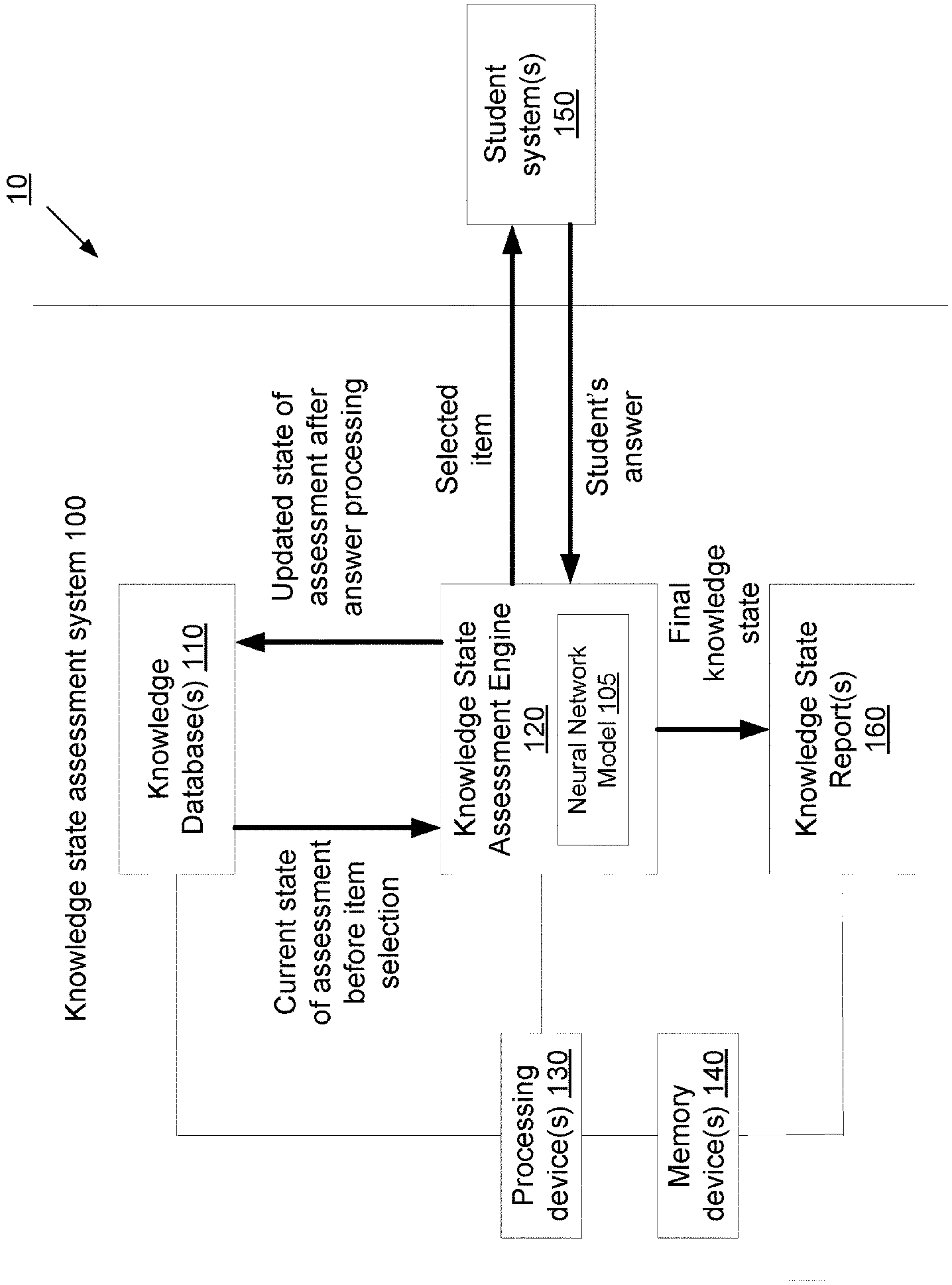
FIG. 1 illustrates an example environment including a knowledge state assessment system, in accordance with one or more embodiments of the present disclosure.

FIG. 1 illustrates an example environment 10 including a knowledge state assessment system 100, according to embodiments of the present disclosure. As illustrated, the knowledge state assessment system 100 is operatively coupled to one or more student systems 150 and one or more knowledge database(s) 110.

According to embodiments, the knowledge state assessment system 100 executes an assessment of a knowledge state of a student associated with a student system 150. In an embodiment, at the beginning of the assessment, the knowledge state assessment system 100 reads a set of initialization parameters from the knowledge database 110, selects an item (e.g., a question) to present to the student and serves the selected item to the student system (e.g., via a web-based program or application). According to embodiments, the one or more knowledge databases 110 can be communicatively coupled to the knowledge state assessment engine 120 via one or more networks. In an embodiment, each time the student submits an answer (i.e., a response) corresponding to a selected item, the knowledge state assessment system 100 identifies a current state of the assessment from the database 110, processes the answer, updates the database 110 with the new state of the assessment, and selects a new item (e.g., a new question) to serve to the student system 150. The assessment process can be executed iteratively until a last or final item is reached (i.e., a last item in a set of items or in a particular time period). After the student system submits an answer to the last item of the assessment, the knowledge state assessment system 100 determines a final knowledge state associated with the student. In an embodiment, the final knowledge state can be provided to one or more systems (e.g., a student system 150, a teacher system, a parent system, etc.) via a knowledge state report 160.

According to embodiments, the knowledge state assessment system 100 includes a knowledge state assessment engine 120 configured to manage and execute a neural network model 105 (e.g., a recurrent neural network (RNN) model employed in the iterative processing of items and answers to assess a current knowledge state of the student). In an embodiment, the neural network model 105 updates probabilities of all items in view of and accordance with the student's answer to the previously selected item. In an embodiment, in view of the student's response or answer, the knowledge state assessment engine 120 executes the neural network model 105 to generate an updated probability for each item which represents an estimated probability that the student has demonstrated knowledge or "knows" the respective item.

The current knowledge state of the student is updated (e.g., a knowledge state that would be returned by the knowledge state assessment system 100 if the iterative assessment process were to terminate or stop) and a new item is selected. According to embodiments, the neural network model 105 updates the item probabilities directly to generate probability estimates that are consistent with a set of possible or feasible knowledge states, as described in greater detail below. Advantageously, the knowledge state assessment system 100 employs the trainable neural network model 105 to adaptively generate the probability estimates in alignment with the possible or feasible knowledge states.

As illustrated, the knowledge state assessment engine 120 executes the neural network model 105 to iteratively generate selected items (e.g., questions) to provide to the student system 150 and receive corresponding answers or responses to each of the selected items. According to embodiments, the knowledge state assessment engine 120 processes the student's answers and generates the probability estimates associated with the set of feasible knowledge states.

In an embodiment, the knowledge state assessment system 100 may be communicatively coupled to the one or more student systems 150 via any suitable network, interface or communication protocol, such as, for example, application programming interfaces (APIs), a web browser, JavaScript, etc.

According to embodiments, the knowledge state assessment system 100 includes one or more memory devices 140 to store instructions executable by one or more processing devices 130 to perform the instructions to execute the operations, features, and functionality described in detail herein.

The term "computing system", "computer" or "computer platform" is intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected", "communicatively coupled", or "coupled" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 2:
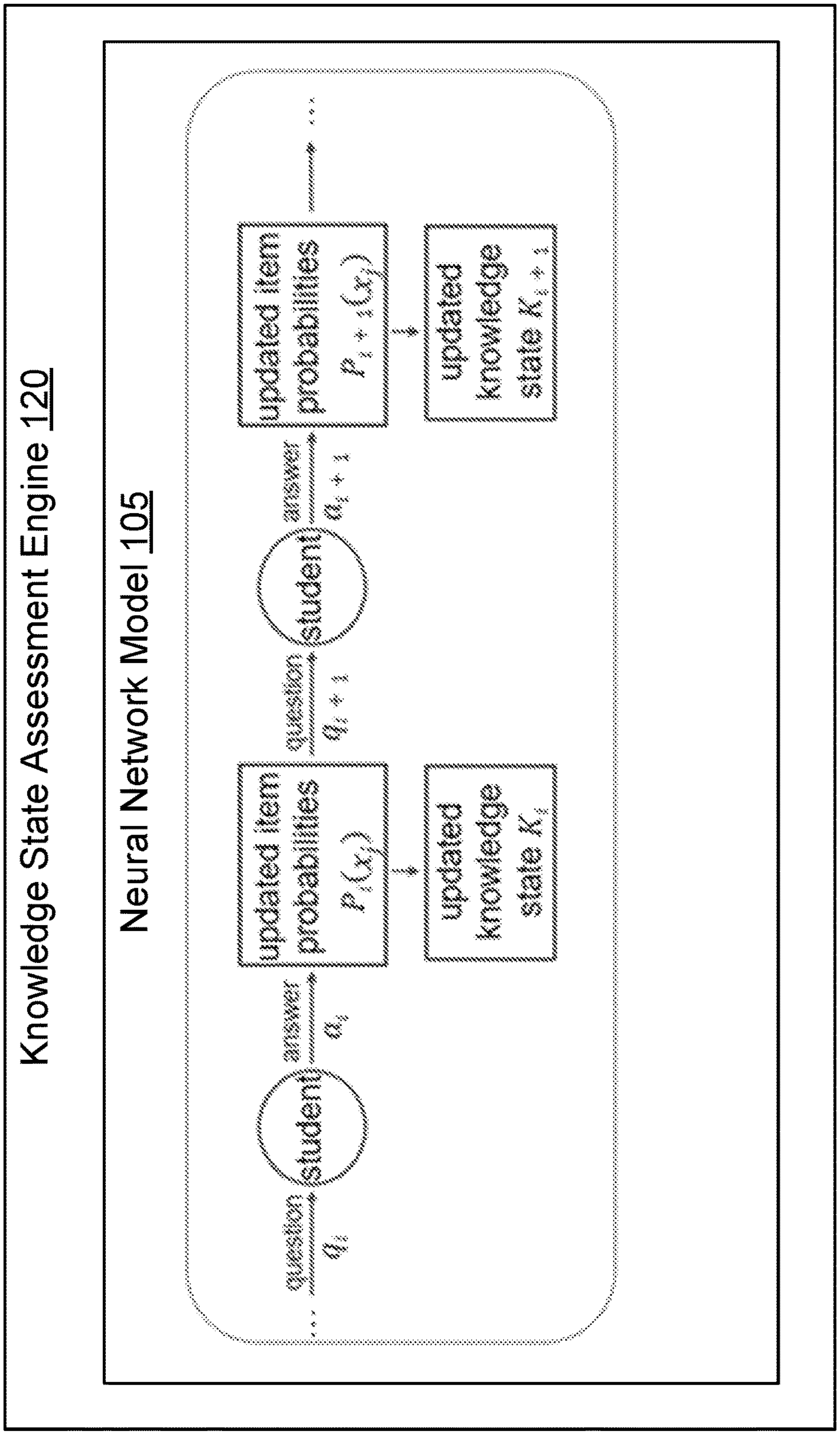
FIG. 2 illustrates an example of an iterative assessment process performed by a neural network model of a knowledge state assessment engine of a knowledge state assessment system, in accordance with one or more embodiments of the present disclosure.

FIG. 2 illustrates an example of the iterative assessment processing performed by a neural network model 105 of a knowledge state assessment engine 120 of a knowledge state assessment system (e.g., knowledge state assessment system 100 of FIG. 1). As shown in FIG. 2, at step or iteration i of the assessment, the knowledge state assessment engine 120 selects an item or question (item $q_i$), provides the item $q_i$ to a student system, receives a response or answer $a_i$ from the student system, and records the student's answer $a_i$ (e.g., stores the student's answer $a_i$ in a knowledge database).

According to embodiments, the neural network model 105 updates the probabilities $P_i(x_j)$ that the student demonstrates knowledge or "knows" item $x_j$, for each of the items in the course product. The probabilities $P_i(x_j)$ are updated by first updating the feature vectors Xi shown in FIGS. 3 and 4. Specifically, after each question qi is asked, the column in Xi that corresponds to the item asked qi and the student's response ai (either correct or incorrect) is changed from having a value of 0 to having a value of 1. Note that any other columns keep their same values; so, any columns previously marked with 0's or 1's retain those values, unless the value in the column is overwritten by the student's most recent question and response. Finally, this new feature vector is processed by the neural network model 105 to generate the new set of probabilities $P_i(x_j)$.

In an embodiment, the data used for the development and generation of both the knowledge structures (e.g., as stored in the knowledge database 110) and the neural network model(s) 105 is collected, sourced, aggregated, retrieved, obtained, etc. from a large number (e.g., tens of millions) of student assessments taken over a large period of time (e.g., a period of many years). In an embodiment, during each assessment, an item unrelated to the adaptive assessment is randomly and uniformly selected from the items in the course product. The student's answer to this item is not used by the adaptive assessment, but is recorded in the database. This item and its answer may be used as a label (e.g., target variable) of the assessment in the training of the neural network model.

Figure 3:
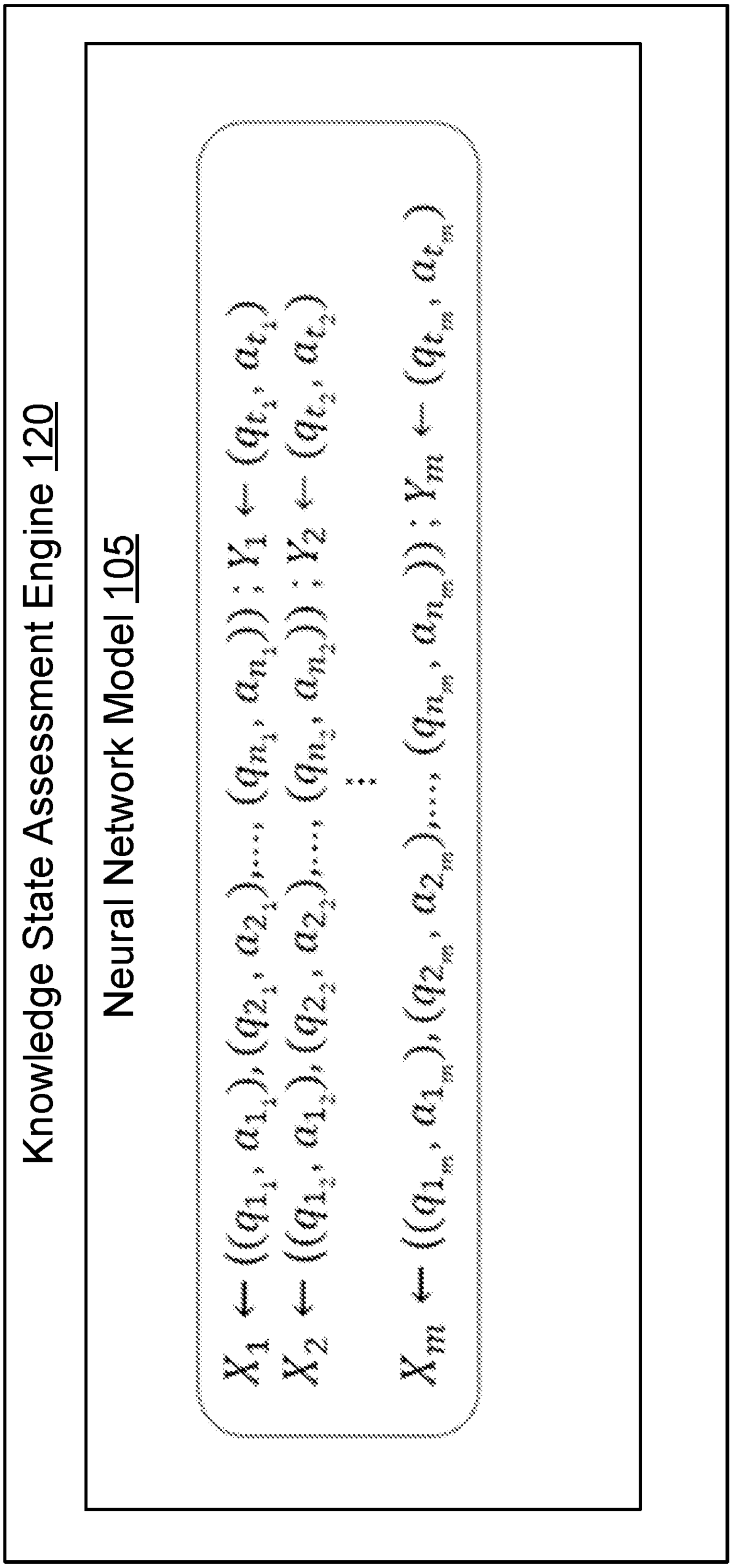
FIG. 3 illustrates an example neural network model of a knowledge state assessment system configured to generate a vector representation corresponding to an initial assessment including a set of items selected by the assessment and their respective answers from a student, in accordance with one or more embodiments of the present disclosure.
Figure 4:
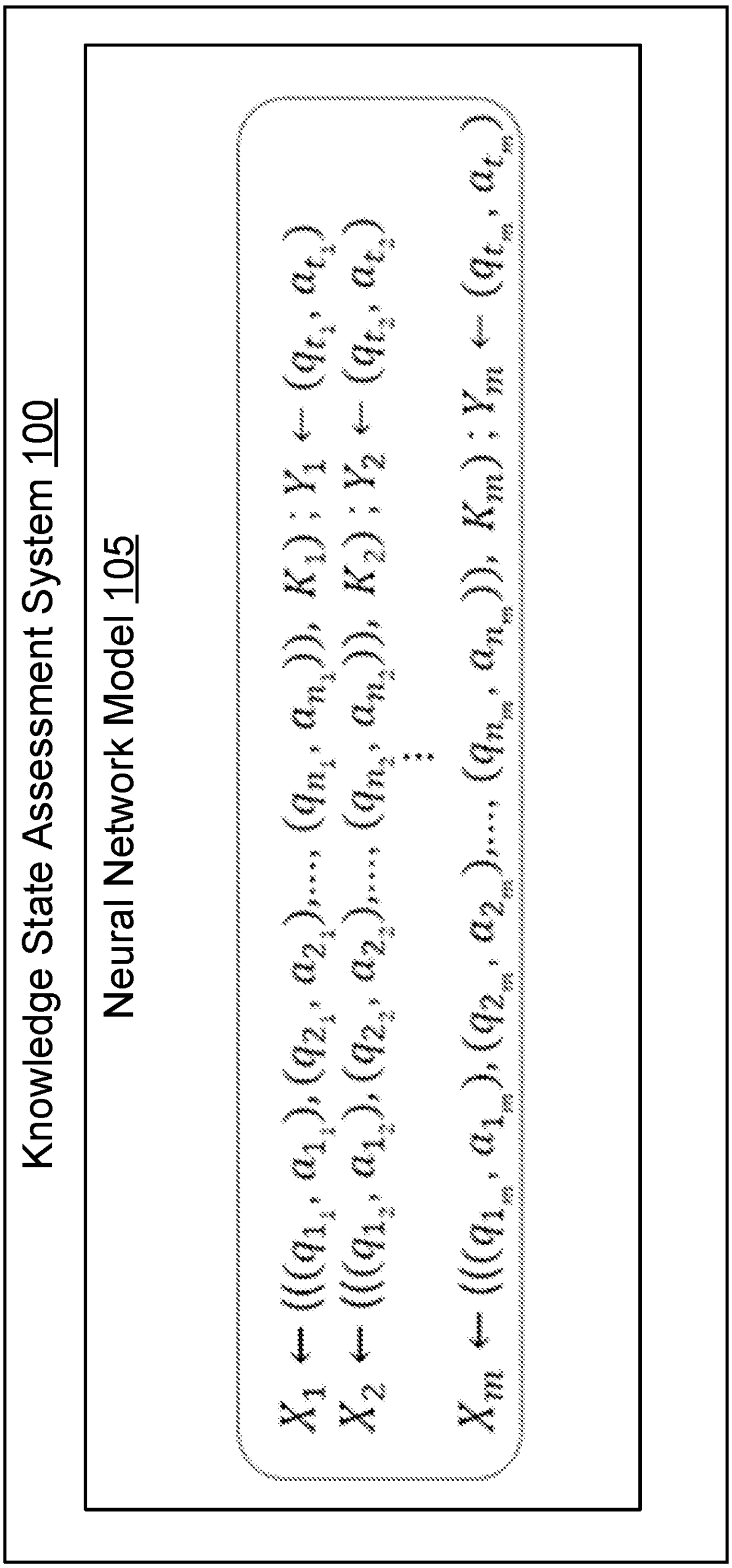
FIG. 4 illustrates an example neural network model of a knowledge state assessment system configured to generate a vector representation corresponding to a subsequent assessment including a set of items selected by the assessment and their respective answers from a student, in accordance with one or more embodiments of the present disclosure.

According to embodiments, with reference to FIGS. 3 and 4, target variables (Yi=(qt_i, at_i)) are generated based at least in part on items. For example, the neural network model 105 identifies a correct answer from a student for an item corresponding to alge738 for assessment i. In response, the neural network model 105 generates a target variable including qt_i=alge738 and at_i=1. In another example, if the student had answered alge738 incorrectly, the neural network model 105 generates a target variable including qt_i=alge738, but the answer value is at_i=0 to signify the answer was incorrect.

According to embodiments, the neural network model 105 has multiple variations dependent on whether the assessment is the first assessment taken by the student (i.e., an initial assessment) or a subsequent assessment, as described in greater detail herein. In an embodiment, the knowledge state assessment engine 120 performs operations to handle an initial assessment of a student, when no prior specific information relating to the student is available. As shown in FIG. 3, for each initial assessment $A_i$, the items $q_i$ selected by the assessment and their respective answers $a_i$ from the student are encoded and stored in a feature vector $X_i$. According to embodiments, any suitable vector generation approached may be employed. For example, a one-hot encoding may be used to generate the feature vector $X_i$. Starting with a vector of all 0's, each question $q_i$ is processed as follows. Depending on both the specific item that corresponds to $q_i$ and the student's response ai, a unique column in the feature is given a value of 1. Thus if, for example, 15 questions have been asked in the assessment, there are 15 columns in the feature vector with a value of 1, while all the other columns have a value of 0. The target variable $Y_i$ for assessment $A_i$ contains the random independent test item $q_t$ asked in each assessment and its answer at.

In an embodiment, following the initial assessment, the neural network model 105 performs operations to maintain and update the knowledge state of the student iteratively over time. Consequently, the neural network model 105 leverages information specific to the student (e.g., a pre-assessment knowledge state associated with the student). As shown in FIG. 4, the neural network model 105 of the knowledge state assessment system 100 uses a feature vector and target variable to handle subsequent assessments of a student.

As shown in FIG. 4, for each subsequent assessment $A_i$, the neural network model 105 encodes items $q_i$ and their respective answers $a_i$ from the student and stores them in a feature vector $X_i$. In an embodiment, the neural network model 105 processes the current knowledge state $K_i$ of the student (i.e., the knowledge state of the student at the time the assessment begins) and appends it to the feature vector $X_i$. As illustrated, the target variable $Y_i$ for assessment $A_i$ contains the random independent test item $q_t$ asked in each assessment and its answer $a_t$. In an embodiment, the random test item and its response are not used to generate the knowledge state that is returned by the knowledge state assessment engine 120. This information is removed from the process of determining the knowledge state, so that it can later be used to give an unbiased evaluation of the system's performance.

For example, the neural network model 105 can generate a student's knowledge state having a number of items (e.g., 103 items) out of a possible larger set of items (e.g., 556 items) associated with a subject area (e.g., Pre-calculus). In this example, this knowledge state may have 50 items pertaining to Algebra and Geometry Review, 25 in Equations and Inequalities, and 28 in Graphs and Functions.

According to embodiments, the neural network model 105 of the knowledge state assessment system 100 may be constrained based on one or more prerequisite properties. For example, item arith033 (e.g., an item associated with the "greatest common factor of 2 numbers") is designated as a prerequisite to alge738 (e.g., an item associated with "factoring out a monomial from a polynomial: Univariate") because the identified feasible states that contains alge738 also contains arith033. Formally, (alge738 in state K) implies (arith033 is in state K), and accordingly can be expressed as: arith033<=alge738.

In an embodiment, the knowledge state assessment engine 120 uses the neural network model 105 to determine the knowledge state of a student by constraining the probability estimates of the items to be consistent with the prerequisite relationship determined by the knowledge structure, as described in greater detail herein.

In an embodiment, for a given knowledge structure, the prerequisite relationships between the items are the partial order≤such that, for any two items q and r and any feasible knowledge state K in the knowledge structure, as represented by the following expression:

$$(q \le r) \Leftrightarrow (\text{wherein } r \text{ is in } K \text{ implies } q \text{ is in } K). \qquad \text{Expression A}$$

According to embodiments, the knowledge state assessment system 100 defines the prerequisite relationship defined by "r is in K implies q is in K" as a partial order on the items. Accordingly, the partial order indicates a reflexive relationship (e.g., "r is in K implies r is in K"), anti-symmetric relationship (e.g., if "r is in K implies q is in K" and "q is in K implies r is in K", then "r=q"), and a transitive relationship (e.g., if "r is in K implies q is in K" and "q is in K implies p is in K", then "r is in K implies p is in K"). The partial order relationship can be written as to denote the corresponding prerequisite relationship.

In an embodiment, the neural network model 105 generates probability estimates that are consistent with the prerequisite relationship if, for any two items x and y and their probability estimates P(x) and P(y), the following expression is satisfied:

$$x < y \Rightarrow P(x) \ge P(y); \qquad \text{Expression B}$$

where x is a prerequisite to y (and x is distinct to y). For example, if "item y is in K" implies "item x is in K", then any probability estimate attributed to item x by the knowledge state assessment engine 120 is determined to be greater or equal to the probability estimate attributed to item y.

Figure 5:
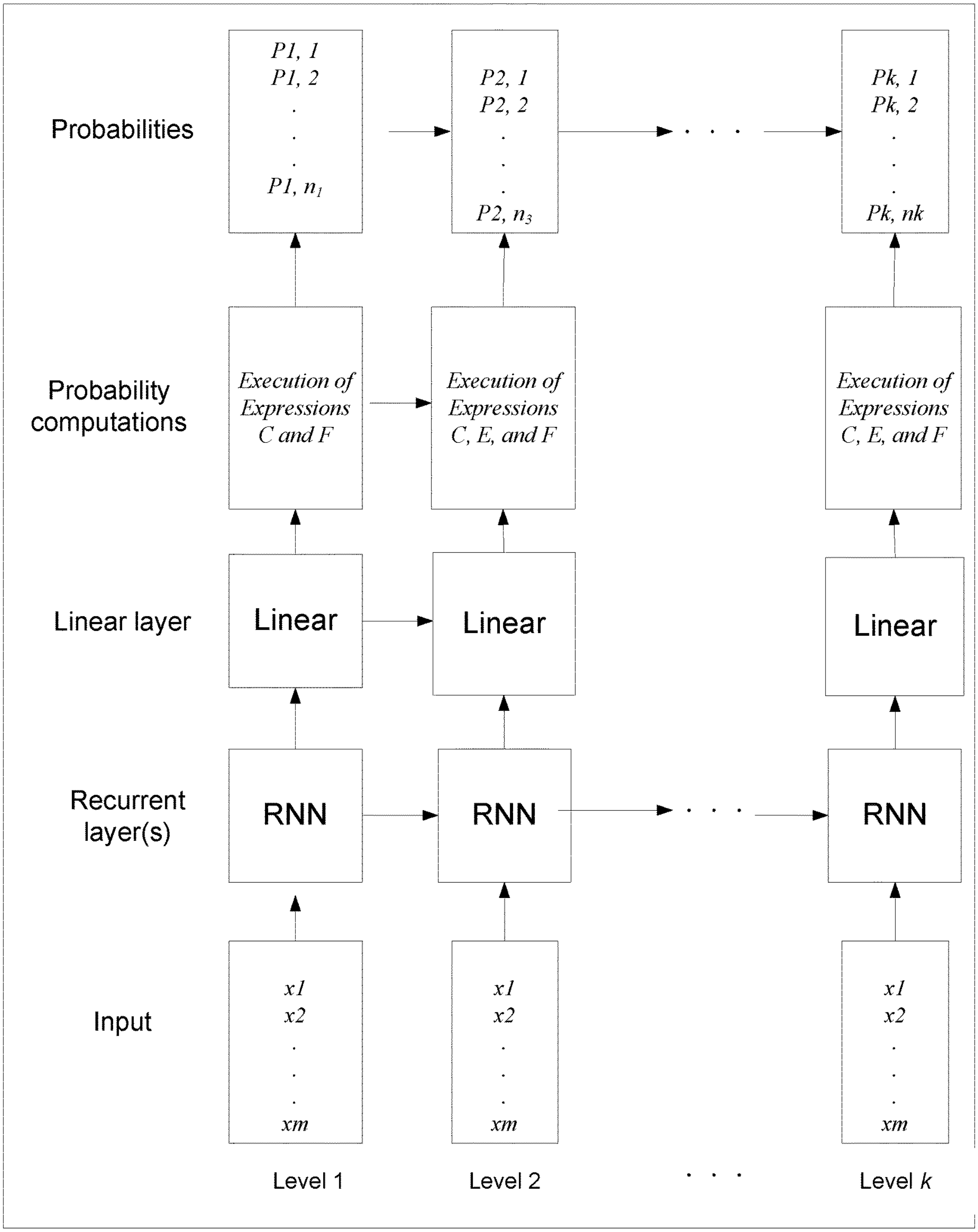
FIG. 5 illustrates an example process flow executable by a neural network model of a knowledge state assessment system to generate a set of probabilities associated with a knowledge state for a student relating to a subject, in accordance with embodiments of the present disclosure.

FIG. 5 illustrates an example process flow executable by the knowledge state assessment system 100 to generate a set of probabilities associated with a knowledge state for a student relating to a subject, in accordance with embodiments of the present disclosure. In an embodiment, consistency is achieved by constraining the neural network model 105 by partitioning the items into levels and performing processing in accordance with a constrained recurrent neural network (RNN) architecture (as shown in FIG. 5), as described in greater detail herein. In an embodiment, the neural network model 105 partitions the items into "levels". In an embodiment, since the prerequisite relation is a partial order, it has maximal items. That is, items r such that there is no item q with r<q (which means r<=q and q distinct from r). The first level is the set of all maximal items with respect to the prerequisite relationship. The second level is obtained by first removing from Q (the set of all items) the items in Level 1. Then, among the remaining items, the maximal items are identified. That is, the items x such that there is no item y with x<y, where x and y are among those remaining items. These items x are the ones in Level 2. The knowledge state assessment engine 120 then removes from Q both Levels 1 and 2 and repeat the process to get the items in Level 3, etc. The above-described process is repeated until there are no more remaining items, indicating the last level has been reached.

In an embodiment, the prerequisite relation induces a partition of the set Q of the items in the course products into "levels", where Q represents a set of all terms (e.g., x_1, x_2, . . . , x_n), as shown in FIGS. 3-5. The partition can be defined recursively as follows:

$\text{Level}_1$ is the set of maximal items with respect to the prerequisite relation; and For i>1, $\text{level}_i$ is the set of maximal items with respect to the prerequisite relation restricted to $$Q - \bigcup_{k=1}^{i-1} (\text{level}_k).$$

In an embodiment, as shown in FIG. 5, the feature vector X=x1, x2, . . . , xm is passed to the RNN layer; note that this same feature vector is used for each level 1 to k. Additionally, for any level after the first, the output of the RNN from the previous level is also passed back into the RNN layer. This RNN layer can be composed of any standard RNN cell, such as long short-term memory (LSTM) or gated recurrent unit (GRU). The matrix computations in the RNN produce a vector that is then passed to the linear layer. After another set of matrix computations, the linear layer outputs a real-valued number, $\beta_{n,x}$, for each item x in the level n, from which the final probability of the item is derived, using the following procedure.

In an embodiment, for level 1, the neural network model 105 applies the logistic function S to each $\beta_{1,x}$ to get the probability P(x) for each item x in level 1, in accordance with the following expression:

$$P(x) = S(\beta_{1,x}) = \frac{1}{1 + e^{-\beta_{1,x}}} \quad \text{Expression C}$$

The above-identified function is applied between the "Linear" and "Probability" layers shown in FIG. 5. As shown in FIG. 5, the function is applied within the boxes in the "Probability computations" row. Then, the function S is used according to the following expression:

$$S(x) = \frac{1}{1 + e^{-x}} \quad \text{Expression D}$$

In an embodiment, for level(s) n and n>1, for each item x in level n, the neural network model 105 computes a maximum probability of all the items q for which x is a prerequisite, in accordance with the following expression:

$$M_x = \max_{x<q} P(q) \quad \text{Expression E}$$

In an embodiment, the neural network model 105 converts $M_x$ back to the logistic scale and uses the converted $M_x$ to compute the probability P(x) of item x, in accordance with the following expression:

$$P(x) = S\left(\log\left(\frac{M_x}{1 - M_x}\right) + \max(0, \beta_{n,x})\right) \quad \text{Expression F}$$

According to embodiments, the knowledge state assessment system 100 determines the knowledge state of a student based on probability estimates of the items that are "positively correlated" with the student's answer. Accordingly, a correct answer to an item should make it more likely that the item is in the student's knowledge state, while an incorrect answer should make it less likely. To enforce this property, the neural network model 105 is trained using a process that adjusts the probability estimates by penalizing the model whenever the estimates are not positively correlated with the student's response.

In an embodiment, let $a_{n_m}$ be the response given by student m to question number n of the assessment, $P_n(x)$ be the estimated probability of item x after question n, and Q be the set of items in the course. In an embodiment, the penalty is represented by the following expression:

$$\alpha * \begin{cases} \sum_{x \in Q} \max(0, P_n(x) - P_{n+1}(x)), & \text{if } a_{n_m} \text{ is correct,} \\ \sum_{x \in Q} \max(0, P_{n+1}(x) - P_n(x)), & \text{if } a_{n_m} \text{ is incorrect,} \end{cases} \quad \text{Expression G}$$

where α is a tunable hyperparameter. In an embodiment, the penalty can be added to the loss function during the training of the neural network model 105.

Figure 6:
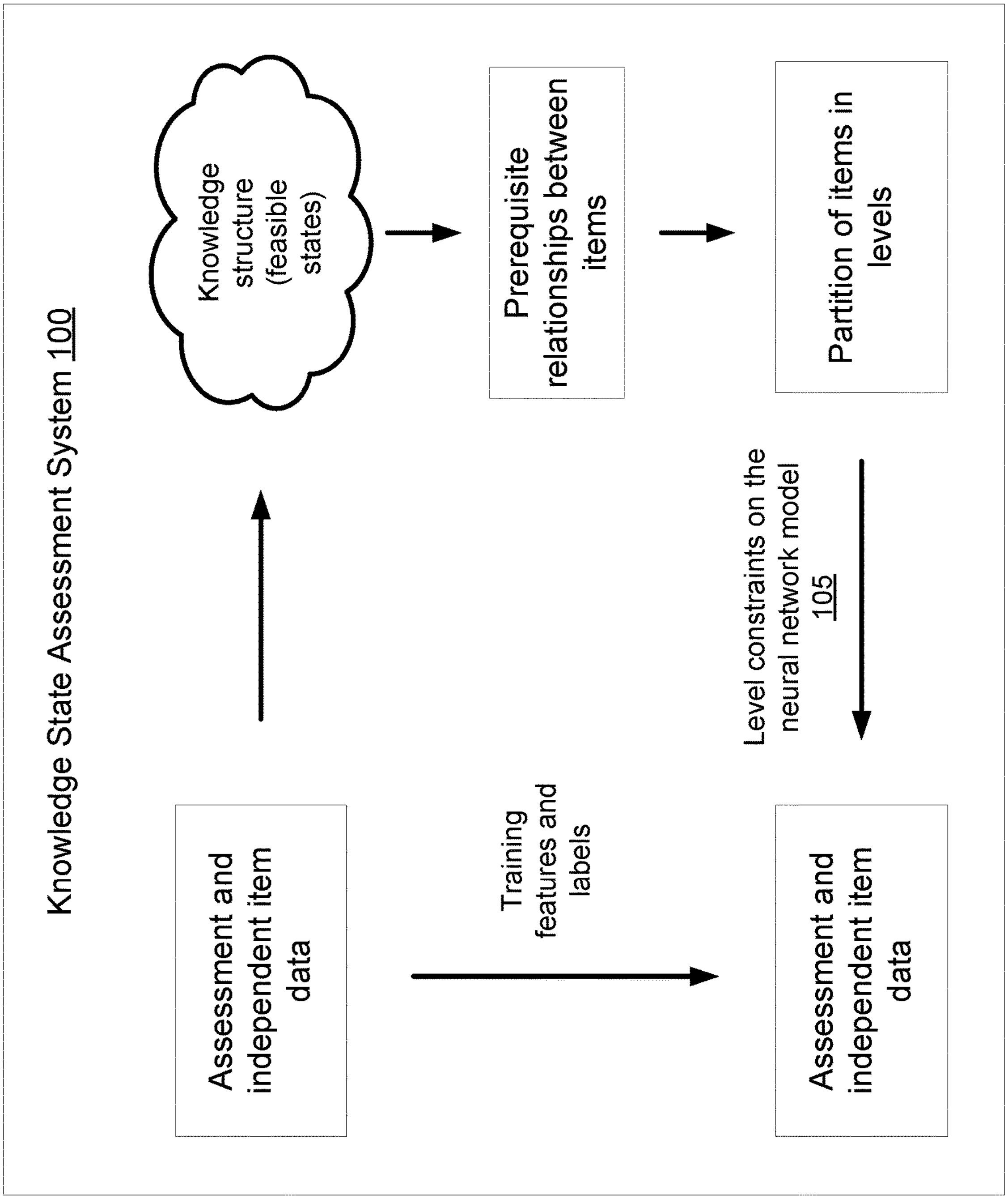
FIG. 6 illustrates an example process flow performed by a knowledge state assessment system to generate a knowledge state of a student relating to a subject, in accordance with embodiments of the present disclosure.

In an embodiment, as shown in FIG. 6, the knowledge state assessment system 100 derives and validates the knowledge structure (i.e., the set or collection of feasible knowledge states) based on a record of historical assessments (e.g., a sequence of questions/answers asked by the knowledge state assessment system 100, including, for example, the independent test question). In an embodiment, the same record of assessments is used for the training of the neural network model 105 (e.g., the RNN of FIG. 5). As shown in FIG. 6, the prerequisite relationship between items derived from the knowledge structure constrains the probability estimates output by the neural network model 105.

The constraints are implemented by processing the probability estimates in order of their "levels".

Figure 7:
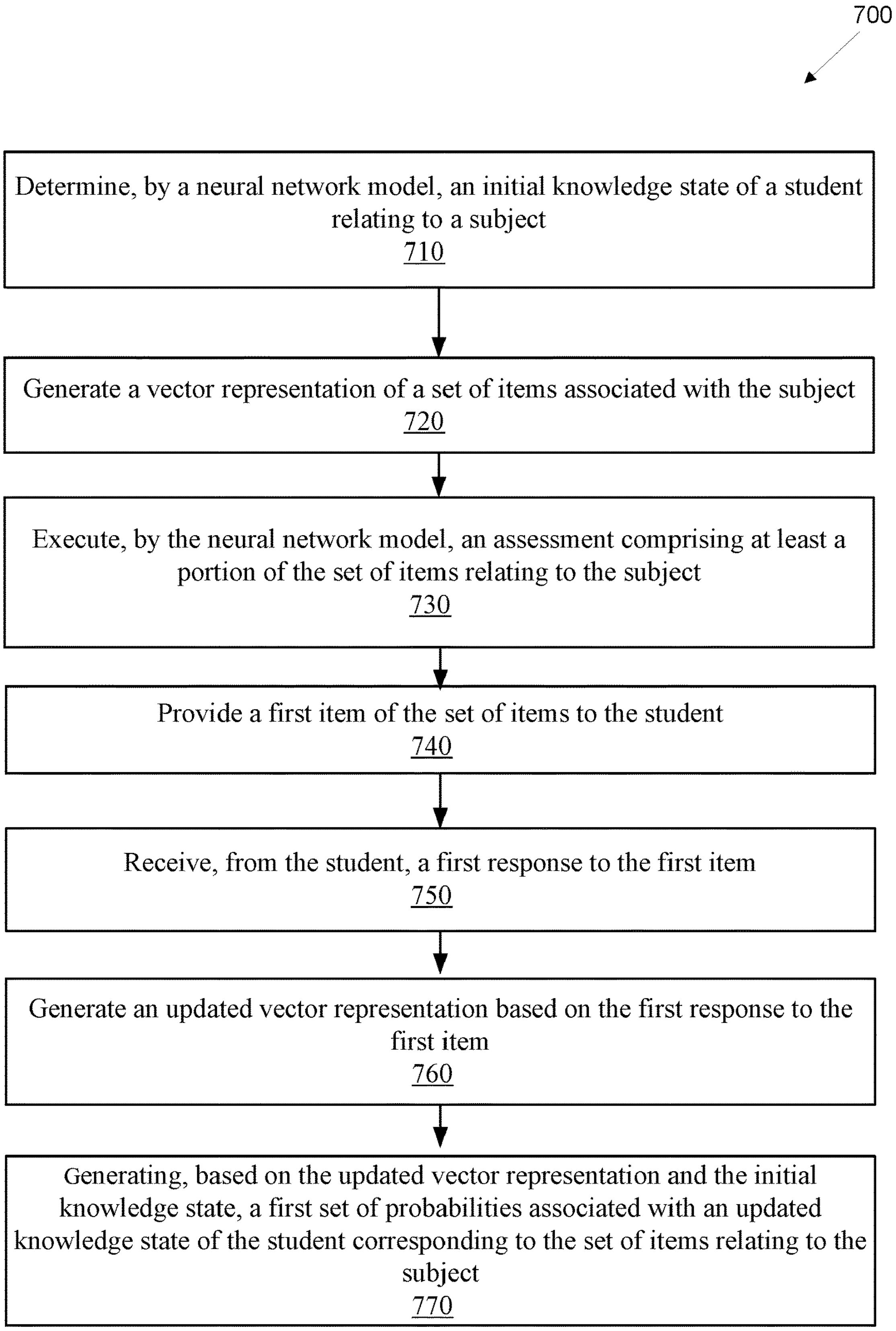
FIG. 7 illustrates an example process flow executable by a neural network model of a knowledge state assessment system to generate a set of probabilities associated with a knowledge state for a student relating to a subject, in accordance with embodiments of the present disclosure.

FIG. 7 is a flow diagram of an example method 700 to generate a set of probabilities corresponding to a knowledge state of the student corresponding to the set of items relating to the subject, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the knowledge state assessment system 100 of FIGS. 1, 2, 3, 4, 5, and 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic determines, by a neural network model executed by the processing logic, an initial knowledge state of a student relating to a subject. At operation 720, the processing logic generates a vector representation of a set of items associated with the subject. At operation 730, the processing logic executes an assessment comprising at least a portion of the set of items relating to the subject. At operation 740, the processing logic provides a first item of the set of items to the student. At operation 750, the processing logic receives, from the student, a first response to the first item.

At operation 760, the processing logic generates an updated vector representation based on the first response to the first item. At operation 770, the processing logic generates, based on the updated vector representation and the initial knowledge state, a first set of probabilities associated with an updated knowledge state of the student corresponding to the set of items relating to the subject.

Figure 8:
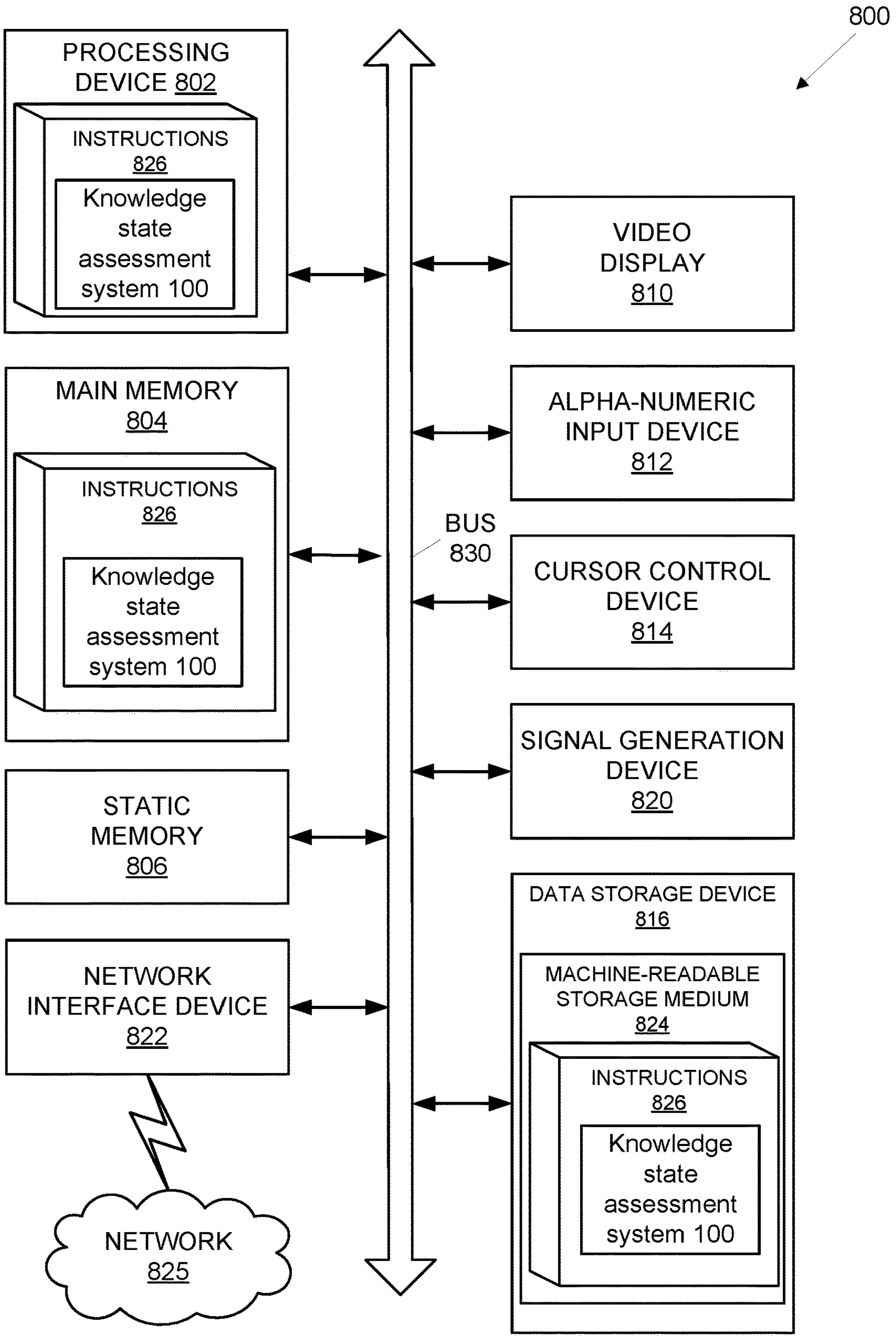
FIG. 8 illustrates an example computer system operating in accordance with some embodiments of the disclosure.

FIG. 8 illustrates an example computer system 800 operating in accordance with some embodiments of the disclosure. In FIG. 8, a diagrammatic representation of a machine is shown in the exemplary form of the computer system 800 within which a set of instructions, for causing the machine to perform any one or more of the methodologies discussed herein, may be executed. In alternative embodiments, the machine 800 may be connected (e.g., networked) to other machines in a local area network (LAN), an intranet, an extranet, or the Internet. The machine 800 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 800. Further, while only a single machine is illustrated, the term "machine" shall also be taken to include any collection of machines that individually or jointly execute a set (or multiple sets) of instructions to perform any one or more of the methodologies discussed herein.

The example computer system 800 may comprise a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 816), which may communicate with each other via a bus 830.

Processing device 802 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute a proficiency profile and recommendation system for performing the operations and steps discussed herein. For example, the processing device 802 may be configured to execute instructions implementing the processes and methods described herein, for supporting the knowledge state assessment system 100, in accordance with one or more aspects of the disclosure.

Example computer system 800 may further comprise a network interface device 822 that may be communicatively coupled to a network 825. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 820 (e.g., a speaker).

Data storage device 816 may include a computer-readable storage medium (or more specifically a non-transitory computer-readable storage medium) 824 on which is stored one or more sets of executable instructions 826 of the knowledge state assessment system 100. In accordance with one or more aspects of the disclosure, executable instructions 826 may comprise executable instructions encoding various functions of the knowledge state assessment system 100 in accordance with one or more aspects of the disclosure.

Executable instructions 826 may also reside, completely or at least partially, within main memory 804 and/or within processing device 802 during execution thereof by example computer system 800, main memory 804 and processing device 802 also constituting computer-readable storage media. Executable instructions 826 may further be transmitted or received over a network via network interface device 822.

While computer-readable storage medium 824 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as “identifying,” “determining,” “analyzing,” “selecting,” “receiving,” “presenting,” “generating,” “deriving,” “providing” or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

determining, by a neural network model executed by a processing device, an initial knowledge state of a student relating to a subject;

generating a vector representation of a set of test questions associated with the subject;

partitioning, by the neural network model, the set of test questions into a set of levels based on prerequisite relationships between the test questions;

executing, by the neural network model, an iterative assessment process comprising providing at least a portion of the set of test questions relating to the subject to the student;

providing, during the iterative assessment process, a first test question of the set of test questions to the student;

receiving, from the student during the iterative assessment process, a first response to the first test question;

generating, during the iterative assessment process, an updated vector representation based on the first response to the first test question;

generating, during the iterative assessment process, by the neural network model based on the updated vector representation and the initial knowledge state, a first set of probabilities representing an updated knowledge state of the student corresponding to the set of test questions relating to the subject, wherein each probability of the first set of probabilities represents an estimated probability that the student has established a threshold level of proficiency for a respective test question of the set of test questions, wherein the neural network model generates the first set of probabilities by:

processing the levels sequentially using a constrained recurrent neural network layer, wherein for each level after a first level, an output of the constrained recurrent neural network layer from a previous level is passed back into the constrained recurrent neural network layer;

executing, for each level, matrix computations in the constrained recurrent neural network layer to produce an output vector representing the test questions in the level, wherein the output vector is passed to a linear layer of the neural network model; and generating, by the linear layer, a real-valued number for each test question in the level based at least in part on the output vector, wherein for each test question in the first level, a respective probability of the first set of probabilities is determined based at least in part on the real-valued number for the test question, wherein for each test question in a level after the first level, a respective probability of the first set of probabilities is determined based at least in part on the real-valued number for the test question and a maximum probability among one or more prerequisite test questions in one or more prior levels, and wherein the probability for each test question in a level after the first level is constrained to be less than or equal to a maximum probability of one or more prerequisite test questions in one or more prior levels;

selecting, during the iterative assessment process, by the neural network model based on the first set of probabilities, a second test question of the set of test questions; and providing, during the iterative assessment process, the second test question of the set of test questions to the student.

2. The method of claim 1, further comprising evaluating the first response to the first test question to generate one of:

a first value in response to determining the first response is correct; or a second value in response to determining the first response is incorrect.

3. The method of claim 2, wherein the updated vector representation comprises the first test question associated with one of the first value or the second value.

4. The method of claim 1, further comprising:

receiving, from the student, a second response to the second test question.

5. The method of claim 4, further comprising generating a further updated vector representation based on the second response to the second test question.

6. The method of claim 5, further comprising generating, based on the further updated vector representation, a second set of probabilities representing a further updated knowledge state corresponding to the set of test questions relating to the subject.

7. The method of claim 1, further comprising:

generating a final knowledge state of the student corresponding to the set of test questions relating to the subject based at least in part on a final set of probabilities corresponding to a final vector representation based on a set of responses to at least a portion of the set of test questions relating to the subject.

8. A system comprising:

a memory to store instructions associated with a neural network model; and a processing device, operatively coupled to the memory, to execute the instructions associated with the neural network model to perform operations comprising:

determining an initial knowledge state of a student relating to a subject;

generating a vector representation of a set of test questions associated with the subject;

partitioning, by the neural network model, the set of test questions into a set of levels based on prerequisite relationships between the test questions;

executing, by the neural network model, an iterative assessment process comprising providing at least a portion of the set of test questions relating to the subject to the student;

providing, during the iterative assessment process, a first test question of the set of test questions to the student;

receiving, from the student during the iterative assessment process, a first response to the first test question;

generating, during the iterative assessment process, an updated vector representation based on the first response to the first test question;

generating, during the iterative assessment process, by the neural network model based on the updated vector representation and the initial knowledge state, a first set of probabilities representing an updated knowledge state of the student corresponding to the set of test questions relating to the subject, wherein each probability of the first set of probabilities represents an estimated probability that the student has established a threshold level of proficiency for a respective test question of the set of test questions, wherein the neural network model generates the first set of probabilities by:

processing the levels sequentially using a constrained recurrent neural network layer, wherein for each level after a first level, an output of the constrained recurrent neural network layer from a previous level is passed back into the constrained recurrent neural network layer;

executing, for each level, matrix computations in the constrained recurrent neural network layer to produce an output vector representing the test questions in the level, wherein the output vector is passed to a linear layer of the neural network model; and generating, by the linear layer, a real-valued number for each test question in the level based at least in part on the output vector, wherein for each test question in the first level, a respective probability of the first set of probabilities is determined based at least in part on the real-valued number for the test question, wherein for each test question in a level after the first level, a respective probability of the first set of probabilities is determined based at least in part on the real-valued number for the test question and a maximum probability among one or more prerequisite test questions in one or more prior levels, and wherein the probability for each test question in a level after the first level is constrained to be less than or equal to a maximum probability of one or more prerequisite test questions in one or more prior levels;

selecting, during the iterative assessment process, by the neural network model based on the first set of probabilities, a second test question of the set of test questions; and providing, during the iterative assessment process, the second test question of the set of test questions to the student.

9. The system of claim 8, the operations further comprising evaluating the first response to the first test question to generate one of:

a first value in response to determining the first response is correct; or a second value in response to determining the first response is incorrect.

10. The system of claim 9, wherein the updated vector representation comprises the first test question associated with one of the first value or the second value.

11. The system of claim 8, the operations further comprising:

receiving, from the student, a second response to the second test question.

12. The system of claim 11, the operations further comprising generating a further updated vector representation based on the second response to the second test question.

13. The system of claim 12, the operations further comprising generating, based on the further updated vector representation, a second set of probabilities representing a further updated knowledge state corresponding to the set of test questions relating to the subject.

14. The system of claim 8, the operations further comprising:

generating a final knowledge state of the student corresponding to the set of test questions relating to the subject based at least in part on a final set of probabilities corresponding to a final vector representation based on a set of responses to at least a portion of the set of test questions associated with the subject.

15. A non-transitory computer readable storage medium comprising instructions that, when executed by a processing device, cause the processing device to perform operations comprising:

determining, by a neural network model executed by the processing device, an initial knowledge state of a student relating to a subject;

generating a vector representation of a set of test questions associated with the subject;

partitioning, by the neural network model, the set of test questions into a set of levels based on prerequisite relationships between the test questions;

executing, by the neural network model, an iterative assessment process comprising providing at least a portion of the set of test questions relating to the subject to the student;

providing, during the iterative assessment process, a first test question of the set of test questions to the student;

receiving, from the student during the iterative assessment process, a first response to the first test question;

generating, during the iterative assessment process, an updated vector representation based on the first response to the first test question;

generating, during the iterative assessment process, by the neural network model based on the updated vector representation and the initial knowledge state, a first set of probabilities representing an updated knowledge state of the student corresponding to the set of test questions relating to the subject, wherein each probability of the first set of probabilities represents an estimated probability that the student has established a threshold level of proficiency for a respective test question of the set of test questions, wherein the neural network model generates the first set of probabilities by:

processing the levels sequentially using a constrained recurrent neural network layer, wherein for each level after a first level, an output of the constrained recurrent neural network layer from a previous level is passed back into the constrained recurrent neural network layer;

executing, for each level, matrix computations in the constrained recurrent neural network layer to produce an output vector representing the test questions in the level, wherein the output vector is passed to a linear layer of the neural network model; and generating, by the linear layer, a real-valued number for each test question in the level based at least in part on the output vector, wherein for each test question in the first level, a respective probability of the first set of probabilities is determined based at least in part on the real-valued number for the test question, wherein for each test question in a level after the first level, a respective probability of the first set of probabilities is determined based at least in part on the real-valued number for the test question and a maximum probability among one or more prerequisite test questions in one or more prior levels, and wherein the probability for each test question in a level after the first level is constrained to be less than or equal to a maximum probability of one or more prerequisite test questions in one or more prior levels;

selecting, during the iterative assessment process, by the neural network model based on the first set of probabilities, a second test question of the set of test questions; and providing, during the iterative assessment process, the second test question of the set of test questions to the student.

16. The non-transitory computer readable storage medium of claim 15, the operations further comprising evaluating the first response to the first test question to generate one of:

a first value in response to determining the first response is correct; or a second value in response to determining the first response is incorrect.

17. The non-transitory computer readable storage medium of claim 16, wherein the updated vector representation comprises the first test question associated with one of the first value or the second value.

18. The non-transitory computer readable storage medium of claim 15, the operations further comprising:

receiving, from the student, a second response to the second test question; and generating a further updated vector representation based on the second response to the second test question.

19. The non-transitory computer readable storage medium of claim 18, the operations further comprising generating, based on the further updated vector representation, a second set of probabilities representing a further updated knowledge state corresponding to the set of test questions relating to the subject.

20. The non-transitory computer readable storage medium of claim 15, the operations further comprising:

generating a final knowledge state of the student corresponding to the set of test questions relating to the subject based at least in part on a final set of probabilities corresponding to a final vector representation based on a set of responses to at least a portion of the set of test questions associated with the subject.

* * * * *